(12) United States Patent
Cook

(10) Patent No.: US 7,886,560 B2
(45) Date of Patent: Feb. 15, 2011

(54) HEAT SHRINK TOOL HOLDER COOLING CART

(76) Inventor: Harold D. Cook, 33642 Via Martos, Dana Point, CA (US) 92629

( * ) Notice: Subject to any disclaimer, the term of this patent is extended or adjusted under 35 U.S.C. 154(b) by 544 days.

(21) Appl. No.: 12/033,721

(22) Filed: Feb. 19, 2008

(65) Prior Publication Data
US 2009/0205811 A1 Aug. 20, 2009

(51) Int. Cl.
*F25D 11/00* (2006.01)
(52) U.S. Cl. ...................................................... 62/430
(58) Field of Classification Search .................. 62/430, 62/434, 457.1, 457.9; 165/80.5
See application file for complete search history.

(56) References Cited

U.S. PATENT DOCUMENTS

| | | |
|---|---|---|
| 845,717 A | 2/1907 | Miller |
| 1,285,589 A | 11/1918 | Barnes |
| 1,404,016 A | 1/1922 | Engelbrekt |
| 1,409,753 A | 3/1922 | Moore |
| 1,539,413 A | 5/1925 | Fish |
| 1,658,504 A | 2/1928 | Weiss |
| 1,936,498 A | 11/1933 | Corbett |
| 1,994,792 A | 3/1935 | Sanderson |
| 2,058,618 A | 10/1936 | Patzig |
| 2,125,005 A | 7/1938 | Jearum |
| 2,150,063 A * | 3/1939 | Jefferson ............... 126/226 |
| 2,161,062 A | 6/1939 | Kilgore |
| 2,374,919 A | 5/1945 | Bruseth |
| 2,729,458 A | 1/1956 | Sacrey |
| 2,860,547 A | 11/1958 | Stephan |
| 2,893,291 A | 7/1959 | Hollis |
| 2,913,935 A | 11/1959 | Flannerty |
| 2,918,290 A | 12/1959 | Werstein |
| 2,920,913 A | 1/1960 | Antila |
| 2,942,891 A | 6/1960 | Zale |
| 3,053,118 A | 9/1962 | Lavallee |
| 3,221,404 A | 12/1965 | Averill |
| 3,267,585 A | 8/1966 | Futer |
| 3,307,243 A | 3/1967 | Andreasson |
| 3,372,951 A | 3/1968 | McCash |
| 3,397,615 A | 8/1968 | Meinke |

(Continued)

FOREIGN PATENT DOCUMENTS

DE          575009          4/1933

(Continued)

*Primary Examiner*—Melvin Jones
(74) *Attorney, Agent, or Firm*—Stetina Brunda Garred & Brucker

(57) ABSTRACT

A cooling unit and method for reducing the temperature of tool holders and heat shrink machine tool extensions to ambient temperature. The cooling unit includes a housing. The housing includes a cooling chamber disposed therein. The cooling chamber disposed within the housing includes a water tank. The water tank is capable of receiving a plurality of the tool holder sleeves. Additionally, a cooling plate is disposed within the cooling chamber. The cooling plate includes a plurality of apertures formed therein. Each one of the apertures is configured to receive the tool holder sleeve. The tool holder sleeve is configured to receive the tool holder. The cooling unit includes a chiller disposed within the housing approximate the water tank. The chiller is in fluid communication with the water tank. The chiller provides the water tank with chilled water to cool the heat shrink tool holders to ambient temperature.

18 Claims, 3 Drawing Sheets

U.S. PATENT DOCUMENTS

| | | | |
|---|---|---|---|
| 3,424,055 A | 1/1969 | Rollat |
| 3,463,048 A | 8/1969 | Owsen |
| 3,557,419 A | 1/1971 | Flannery |
| 3,643,546 A | 2/1972 | Richter et al. |
| 3,678,632 A | 7/1972 | Eversole et al. |
| 3,725,994 A | 4/1973 | Wechsler |
| 3,734,515 A | 5/1973 | Dudek |
| 3,807,804 A | 4/1974 | Kniff |
| 3,876,320 A | 4/1975 | Phillipson |
| 3,937,587 A | 2/1976 | Lindern et al. |
| 3,945,752 A | 3/1976 | Bennett |
| 3,989,260 A | 11/1976 | Zonkov et al. |
| 3,994,615 A | 11/1976 | Narang |
| 4,021,051 A | 5/1977 | Toyomoto et al. |
| 4,099,889 A | 7/1978 | Vig |
| 4,133,545 A | 1/1979 | Komori |
| 4,226,562 A | 10/1980 | Schmid et al. |
| 4,251,113 A | 2/1981 | Mitin et al. |
| 4,274,774 A | 6/1981 | Haga et al. |
| 4,298,208 A | 11/1981 | Benjamin et al. |
| 4,305,203 A | 12/1981 | Bock et al. |
| 4,377,292 A | 3/1983 | Staron |
| 4,436,463 A | 3/1984 | Rea |
| 4,453,775 A | 6/1984 | Clemmow |
| 4,483,108 A | 11/1984 | Howard |
| D277,358 S | 1/1985 | Krencik |
| 4,560,289 A | 12/1985 | Wood, III |
| 4,619,564 A | 10/1986 | Jacobson |
| 4,619,566 A | 10/1986 | Botimer |
| 4,642,005 A | 2/1987 | Kondo et al. |
| 4,655,655 A | 4/1987 | Schurfeld |
| 4,668,138 A | 5/1987 | Carter |
| 4,795,292 A | 1/1989 | Dye |
| 4,803,787 A | 2/1989 | Amann |
| 4,808,049 A | 2/1989 | Cook |
| 4,811,632 A | 3/1989 | Salyer |
| 4,818,161 A | 4/1989 | Cook |
| 4,934,743 A | 6/1990 | Kapgan et al. |
| 4,971,491 A | 11/1990 | Cook |
| 4,991,991 A | 2/1991 | Ito et al. |
| 4,993,894 A | 2/1991 | Fischer et al. |
| 5,024,563 A | 6/1991 | Randall |
| 5,048,375 A | 9/1991 | Kobayashi |
| D320,730 S | 10/1991 | Ediger et al. |
| D342,432 S | 12/1993 | Sadoway |
| 5,277,435 A | 1/1994 | Kramer et al. |
| 5,280,671 A | 1/1994 | Marquart |
| 5,311,654 A | 5/1994 | Cook |
| 5,582,494 A | 12/1996 | Cook |
| 5,588,225 A | 12/1996 | Becker et al. |
| 5,655,859 A * | 8/1997 | Melzer et al. ............... 409/132 |
| 5,775,857 A | 7/1998 | Johne |
| 5,797,605 A | 8/1998 | Gross et al. |
| 5,975,816 A | 11/1999 | Cook |
| 6,161,309 A * | 12/2000 | Cook ......................... 34/395 |

FOREIGN PATENT DOCUMENTS

| | | |
|---|---|---|
| DE | 662704 | 7/1938 |
| DE | 1008085 | 5/1957 |
| DE | 1008546 | 5/1957 |
| DE | 1238311 | 4/1967 |
| DE | 2229374 | 1/1974 |
| DE | 2759007 | 8/1978 |
| DE | 3701602 | 8/1988 |
| EP | 0026751 | 4/1981 |
| GB | 425539 | 3/1935 |
| GB | 551065 | 2/1943 |
| GB | 921522 | 3/1963 |
| GB | 1319200 | 6/1973 |
| GB | 2137124 A | 10/1984 |
| GB | 729295 | 5/1995 |
| JP | 57107710 | 5/1982 |
| SU | 376182 | 4/1973 |
| SU | 1493389 | 7/1989 |

* cited by examiner

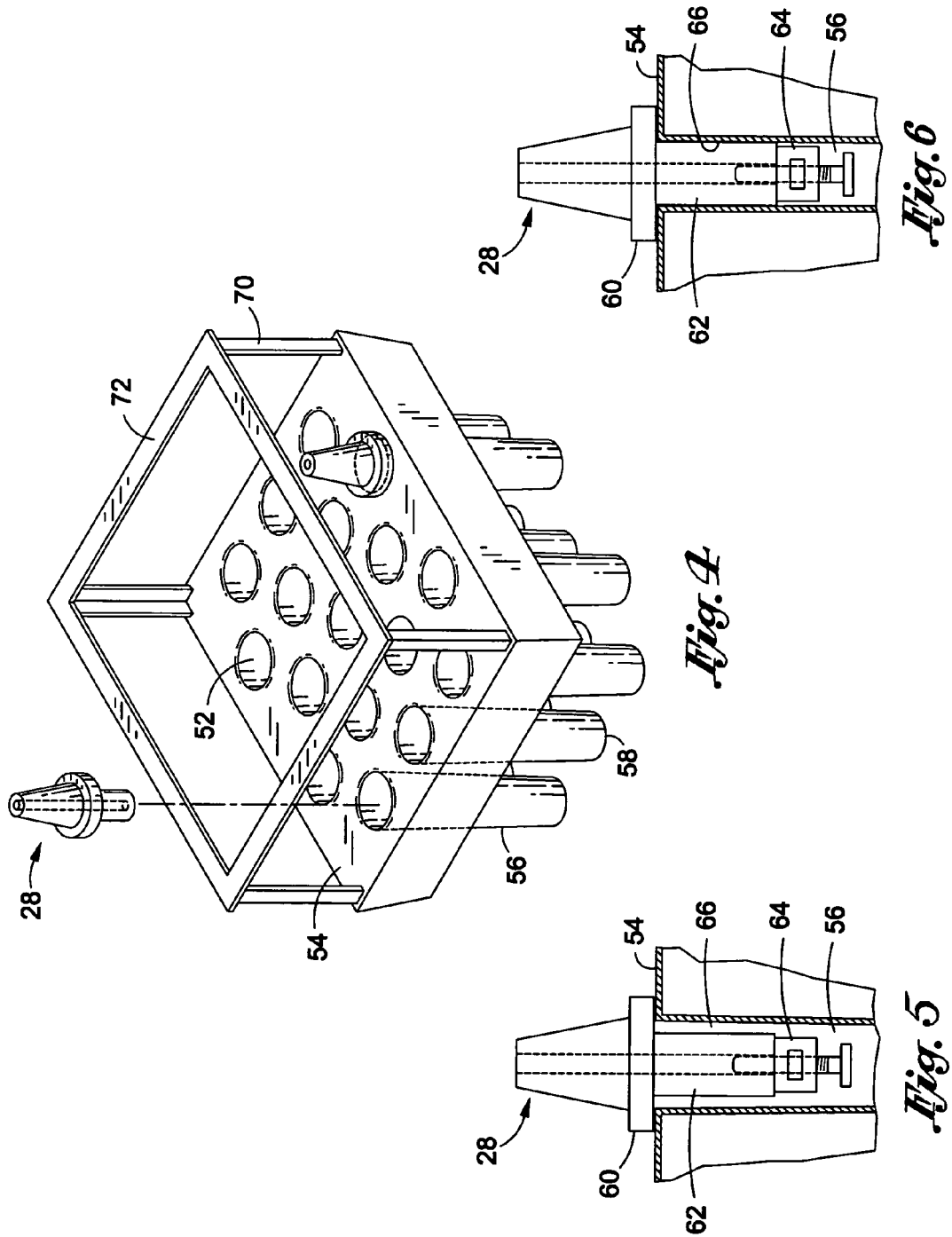

HEAT SHRINK TOOL HOLDER COOLING CART

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to the machine tool art and, more particularly, to an improved heat shrink tool holder cooling cart.

Machine tool holders are used to interface the rotating spindle of a boring or milling machine to a cutting tool that will be used to machine or cut a workpiece. The cutting tool is securely mounted to the tool holder which is then drawn or pulled tightly into the spindle of the machine so as to rigidly maintain the cutting tool within the tool holder and the machine.

It is well known in the art to use heat shrink tool holders for high tolerance machining applications for their ability to mount a cutting tool concentrically within the tool holder. In such tool holders, there is provided a central aperture sized slightly smaller than the diameter of the shank of the cutting tool to be used on the milling or grinding machine. The cutting tool is only insertable into the central aperture when the tool holder has been heated to the temperature necessary to thermally expand the tool holder and consequently the central aperture to a size which can accept the cutting tool shank. Subsequent to the insertion of the shank there into, the tool holder is allowed to cool to the ambient temperature, thereby decreasing the size of the diameter of the central aperture. The thermal contraction of the tool holder and therefore the aperture creates a metal to metal contact between the cutting tool and the tool holder to thereby rigidly secure the cutting tool to the tool holder.

Additionally, machine tool extensions have been formed with heat shrink fittings such that cutting tools are secured to the machine tool extension by the heat shrink process. Such extensions are typically formed with a bore extending axially within one end, with the opposite end of the extension being insertable into the tool holder of a milling or boring machine. Similar to the central aperture of the heat shrink tool holder, the bore of the extension is sized slightly smaller than the shank diameter of the cutting tool. Therefore, the cutting tool shank is only insertable into the bore when the machine tool extension is heated to a temperature sufficient to thermally expand the bore to a size which can accept the cutting tool shank. Subsequent to the insertion of the shank into the bore, the cooling of the extension and the resultant thermal contraction of the bore creates a metal to metal contact between the extension and the cutting tool, thereby rigidly securing the cutting tool to the extension.

However, while the heat shrink tool holder or extension is cooling to ambient temperature, it cannot be used for machining operations because the cutting tool is not rigidly secured to the tool holder. Furthermore, during cooling to ambient temperature, the tool holder is too warm to handle and thus cannot be used. Therefore, after inserting the tool into the heated tool holder, the tool holder must be allowed to cool to ambient temperature in order to provide the strongest union between the cutting tool and tool holder. Only when the tool holder has cooled to ambient temperature can it be used for machining operations. There exist devices to cool heat shrink tool holders and extensions that use a fan or blower for directing the flow of air over the tool holder and thereby capable of cooling the heat shrink tool holder to ambient temperature. Additionally, chillers may also be used to cool heat shrink tool holders to ambient temperature by directing cool air or water over the tool holder. A problem associated with directing cool water over the heat shrink tool holders is the rust as a consequence of iron reacting with oxygen in the presence of water. However, the use of a fan or blower may not be adequate to cool the heat shrink tool holder to ambient temperature expeditiously as may be required during a manufacturing process. Further, the use of a chiller to cool heat shrink tool holders to ambient temperature is difficult to implement in a mobile cooling cart. There exists a need in the art for an improved cooling cart capable of expeditiously cooling heat shrink tool holders to ambient temperature. There also exists a need in the art for a method of cooling heat shrink tool holders using a cooling process utilizing both convection and conduction.

The present invention addresses the deficiencies in prior art coolers by providing a cooler that uses a chiller and pump to circulate cool water into a water tank to therefore cool the tool holders by a thermal conduction method. Therefore, the present invention provides a cooler unit capable of cooling heat shrink tool holders or extensions to ambient temperature with or without requiring the use of a fan or blower to propel ambient temperature air over the heated tool holders.

BRIEF SUMMARY

In accordance with the present invention, there is provided a cooling unit to reduce the temperature of tool holders and heat shrink machine tool extensions to ambient temperature. The tool holder to be cooled by the cooling unit includes a central aperture extending axially therein. The tool holder also includes an outer portion having a support member. The support member is used to support the tool holder on a cooling plate. The tool holder also includes a reduced diameter portion. The reduced diameter portion of the tool holder projects into a tool holder sleeve. The cooling unit also includes a housing. The housing includes a cooling chamber disposed therein. The cooling chamber disposed within the housing includes a water tank. The water tank is capable of receiving a plurality of the tool holder sleeves. Additionally, a cooling plate is disposed within the cooling chamber. The cooling plate includes a plurality of apertures formed therein. Each one of the apertures is configured to receive the tool holder sleeve. The tool holder sleeve is configured to receive the tool holder. The tool holder sleeve includes an inner diameter that is less than a diameter of the tool holder support member. The inner diameter of the tool holder sleeve is greater than a diameter of the reduced portion of the tool holder. The cooling unit also includes a chiller disposed within the housing approximate the water tank. The chiller is in fluid communication with the water tank. The chiller provides the water tank with chilled water to cool the heat shrink tool holders or machine tool extensions to ambient temperature.

In one embodiment of the present invention, the tool holder sleeve is variable in size and shape to accommodate a variety of tool holders. Additionally, the diameter of the tool holder sleeve is less than the diameter of at least one aperture from the plurality of apertures on the cooling plate for the cooling plate to receive the tool holder sleeve. An aspect of the present invention contemplates the tool holder sleeve being accessibly removably mountable to the cooling plate such that a portion of the tool holder sleeve formed therein is disposed within the water tank. Additionally, the tool holder sleeve may have an adjustable length. In accordance with the present invention, the tool holder sleeve is tapered for receiving the reduced diameter portion of the heat shrink tool holder. Another aspect of the present invention contemplates the reduced diameter portion of the heat shrink tool holder being in contact with an inner surface of the tool holder sleeve. The tool holder sleeve may be fabricated from a metallic material that functions like a heat sink. It is contemplated that the metallic material is aluminum. Furthermore, the tool holder sleeve may be configured to receive a heat shrink machine tool extension.

In one embodiment of the present invention, the cooling plate is accessibly removably mountable within the cooling chamber. The cooling plate may comprise of at least one strut attached to the cooling plate for supporting the cooling plate in the cooling chamber. In accordance with an embodiment of the present invention, the cooling unit may further comprise a water reservoir. The water reservoir may be disposed within the housing approximate the water tank. The water tank of the cooling chamber is in fluid communication with the water reservoir. The water reservoir accepts water from the water tank. Additionally, the water reservoir is in fluid communication with the chiller. The water reservoir selectively regulates the flow of water to the chiller. It is also contemplated that the cooling unit may further comprise of a pump. The pump is disposed within the housing and configured to circulate water from the chiller to the water tank. The cooling unit may further comprise a blower disposed within the housing. The blower may be located proximate the cooling plate for propelling a flow of ambient temperature air over the cooling plate.

In accordance with the present invention, a method for cooling heat shrink tool holders is also provided. The method includes a first step of receiving a tool holder sleeve on a cooling plate. The cooling plate includes a plurality of apertures for receiving a plurality of tool holder sleeves. The method continues by placing the heated tool holder in the tool holder sleeve. The tool holder includes a support member for supporting the tool holder on the cooling plate. The tool holder also includes a reduced diameter portion for projecting into the tool holder sleeve. The next step includes maintaining cooled water within a water tank. A portion of the tool holder sleeve is disposed within the water tank. The tool holder sleeve is cooled by the water within the water tank thereby cooling the tool holder to ambient temperature. It is also contemplated that the method includes pumping cooled water from a chiller to the water tank. The method may include measuring the water level within the water tank for regulating the water level.

In another embodiment of the present invention, a cooling unit for reducing a temperature of at least one heat shrink tool holder is provided. The cooling unit includes a housing defining a cooling chamber. The cooling unit also includes a water tank disposed within the cooling chamber. A cooling plate is also contemplated. The cooling plate having a plurality of apertures formed therein. Each one of the apertures is configured to receive a tool holder sleeve, the tool holder sleeve being configured to receive the tool holder. The cooling unit also includes a chiller disposed within the housing and adjacent the water tank. The chiller may selectively regulate the flow of cooled water into the water tank. It is also contemplated that the cooling unit include a water reservoir. The water reservoir is in fluid communication with the chiller and the water tank. The water tank may release heat gained water to the water reservoir. The water reservoir may also provide the chiller with water to be cooled.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 is a perspective view illustrating a cooling tray;

FIG. 5 is a partial cross-sectional view illustrating a heat shrink tool holder within a sleeve; and FIG. 6 is a partial cross-sectional view illustrating a heat shrink tool holder within a tapered sleeve.

DETAILED DESCRIPTION

Figure 1:
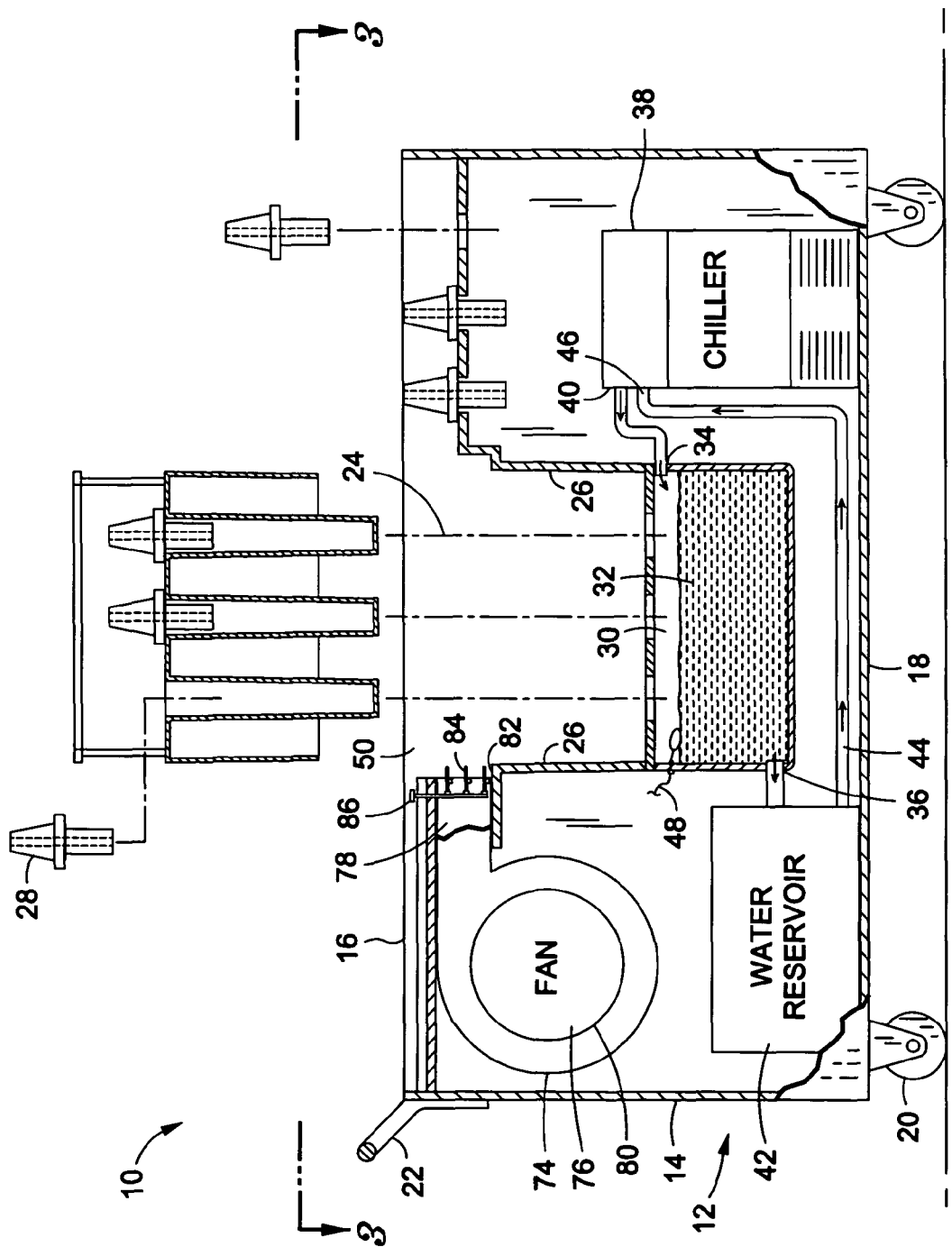
FIG. 1 is a partial cross-sectional view of the heat shrink tool holder cooler.

Referring now to the drawings wherein the showings are for purposes of illustrating embodiments of the present invention only and not for purposes of limiting the same, shown in FIG. 1 is a partial cross-sectional view of a cooling unit or heat shrink tool holder cooler 10 constructed in accordance with an embodiment of the present invention. The cooler 10 is a mobile unit such as a rectangular cart 12 that can support the necessary elements for the cooler 10 to operate. The cart 12 is constructed from four sidewalls 14, a top wall 16 and a bottom wall 18. Attached to the bottom wall 18 are four castors 20 which enable the cart 12 to be easily pushed to and from a work area or station by a cart handle 22. Furthermore, a cooling chamber 24 is defined in cart 12 by cooling chamber sidewalls 26, the top wall 16 and the base portion of a water tank 30. As will be recognized, it is not necessary for the cart 12 to be rectangular, and that it can be any shape and size that facilitates the cooling of heat shrink tool holders 28 placed therein. The cooling chamber 24 is the area used to cool the heat shrink tool holder to ambient temperature. Additionally, within the cooling chamber 24 is the water tank 30. The water tank 30 maintains chilled water within the cooling chamber 24. The water tank 30 may be any tank sufficient for storing water 32. The water tank 30 may also include an inlet 34 for receiving cooled or chilled water. Additionally, the water tank 30 may include an outlet 36 for removing water 32 from the water tank 30. It is also contemplated that the water tank 30 is insulated. The insulation (not shown) improves the water tanks 30 ability to maintain cooled water within the water tank 30.

Still referring to FIG. 1, approximate the cooling chamber 24 is a chiller 38. The chiller 38 may be any portable chiller unit available on the consumer market. The chiller 38 may also be coupled to a water pump for circulating cooled or chilled water from the chiller outlet 40 into the water tank 30. The chiller 38 is in fluid communication with the cooling chamber 24. In particular, the chiller 38 provides cooled or chilled water to the water tank 30. The water tank 30 receives the cooled water from chiller 38 at water tank inlet 34. Additionally, approximate cooling chamber 24 is a water reservoir 42. Water tank 30 is in fluid communication with the water reservoir 42. Water may flow into the water reservoir 42 from a water tank outlet 36. Furthermore, the water reservoir 42 is in fluid communication with chiller 38. An aspect of the present invention contemplates a water pump coupled to the water reservoir 42 for circulating water to the chiller 38 via a reservoir outlet 44 and into a chiller inlet 46. As such, the water reservoir 42 provides the chiller 38 with water to be cooled or chilled by the chiller 38. In one embodiment of the present invention, the water reservoir 42 receives water 32 from water tank 30 when the water level of the water tank 30 reaches a particular depth. The depth of the water 32 within the water tank 30 may be determined by using a sensor control float 48. The sensor control float 48 is located within the water tank 30. The sensor control float 48 in one aspect of the present invention may determine the water depth based upon the angle the sensor control float 48 is positioned at. The sensor control float 48 may determine if the water level within the water tank 30 must be increased or decreased. For example, if the sensor control float 48 determines that the water level within the water tank 30 must be decreased, water may be released via the water tank outlet 36 and into the water reservoir 42. In another example, the sensor control float 48 may determine that the water level within the water tank 30 must be increased in order to provide adequate cooling within the cooling chamber 24. In this situation, the chiller 38 may circulate more water to water tank 30. Alternatively, another aspect of the present invention contemplates a thermometer for accurately measuring the water temperature. If the water temperature increases, more water may be circulated into the water tank 30 from the chiller 38. Additionally, water may be released from the water tank 30 in order to circulate more cooled water within the water tank 30. The water reservoir 42 receives water from the water tank 30 when the water 32 in water tank 30 increases to a particular temperature. In another embodiment of the present invention, the cooling unit 10 does not require the water reservoir 42. The water tank outlet 36 may function as a water outflow to the chiller 38 relying on gravity to maintain the required water level within the water tank 30.

As can be seen in FIG. 1, the cart 12 is also fabricated with a cooling chamber opening 50 disposed in the top wall 16. The cooling chamber opening 50 allows access into cooling chamber 24 for inserting and removing a tool holder sleeve 56 as shown FIGS. 2 and 4. The tool holder sleeve 56 receives the heat shrink tool holder 28. It is contemplated that the tool holder sleeve 56 may be configured in various shapes and sized to accommodate a variety of different tool holders 28. Thus, the tool holder sleeve 56 is contemplated to be freely interchangeable with respect to a cooling plate 54. Additionally, the tool holder sleeve 56 may vary in length. The depth at which the tool holder sleeve 56 is disposed within the water tank 30 is dependent upon the length of the tool holder sleeve 56. This is an important consideration for cooling the tool holder 28 to an ambient temperature. The cooling chamber opening 50 provides access to the tool holder sleeve 56 to remove the tool holder sleeve 56 from the cooling plate 54 or to mount the tool holder sleeve 56 onto the cooling plate 54. In another aspect of the present invention, the tool holder sleeve 56 is tapered for receiving a reduced diameter portion of the tool holder 28. Furthermore, the reduced diameter portion of the tool holder 28 is in contact with an inner surface of a tapered tool holder sleeve 56 as shown in FIG. 6. The cooling chamber opening 50 can be covered with a cooling chamber cover (not shown) in order to help facilitate the cooling of the tool holder 28.

As can best be seen in FIG. 4, the cooling plate 54 itself comprises a generally rectangular cooling plate 54 which in one embodiment is permanently affixed within the cooling chamber 24. It is also contemplated that the cooling plate 54 may be fabricated to different shapes and sizes. It is also contemplated that the cooling plate 54 is sized to be insertable into the cooling chamber 24 via the cooling chamber opening 50 and removable via the same opening 50. The cooling plate 54 may be fabricated from a metallic material such as aluminum whereby the cooling plate 54 acts as a heat sink to draw heat away from the heated tool holders 28 by a conduction method. Disposed within the cooling plate 54 is a plurality of apertures 52 for receiving the tool holder sleeve 56. The diameter of the aperture 52 located on the cooling plate 54 is greater than the diameter of the tool holder sleeve 56 in order to properly receive the tool holder sleeve 56. The tool holder sleeve 56 may be configured for retaining respective ones of a plurality of tool holders 28. The distal end 58 of the plurality of tool holder sleeves 56 may be configured such that when the tool holder sleeve 56 is mounted within the aperture 52 of the cooling plate 54, the distal end extends into the water tank 30. It is also contemplated that the plurality of tool holder sleeves 56 may be disposed within water tank 30 at various depths dependent upon the length of the tool holder sleeves 56. As may be seen in FIG. 5, the heat shrink tool holder 28 has a support member 60. In one embodiment of the present invention, the support member is an annular flange 60 encircling the perimeter of the tool holder 28. The flange 60 supports the tool holder 28 on the cooling plate 54 while still enabling a reduced diameter portion 62 of tool holder 28 and cutting tool 64 to project into the tool holder sleeve 56. Therefore, in order for proper operation, the diameter of tool holder sleeve 56 is sized smaller than the diameter of flange 60 but larger than the diameter of reduced portion 62 such that flange 60 will be supported by the top surface of cooling plate 54 and not fall through the tool holder sleeve 56. As can be observed, tool holder sleeve 56 accepts the heat shrink tool holder 28, however sleeve 56 and the diameter of the reduced portion 62 of heat shrink tool holder 28 may be positioned such that there exists an air gap 66 between the sleeve 56 and the reduced diameter portion 62 of tool holder 28. Air gap 66 may not be ideal for reducing the temperature of the heat shrink tool holder 28. FIG. 6 reveals another embodiment of the present invention wherein the tool holder sleeve 56 is tapered such that the air gap between the sleeve 56 and the reduced diameter portion 62 of heat shrink tool holder 28 is minimized. The tapered tool holder sleeve 56 is sized such that there is contact between the surface of tool holder 28 and the surface of sleeve 56. Additionally, the tapered sleeve 56 is made of metal, preferably aluminum. Because metal acts as a thermal conductor, thus, the thermal conduction improves when the surface to surface contact between the tapered sleeve 56 and tool holder 28 is maximized. A tapered sleeve 56 as shown receives tool holder 28 and results in maximizing metal to metal contact. As a result, increased thermal conduction allows for the heated tool holder 28 to cool to ambient temperature faster.

Referring again to FIG. 4, the cooling plate 54 may be attached to the top wall 16 of the cart 12. It is contemplated that the cooling plate 54 may hang or suspend from the top wall 16 via four bolts. In another embodiment, the cooling plate 54 also comprises four vertical support struts 70, the lower ends of which are rigidly attached to respective ones of the four corners of the cooling plate 54. Attached to the top ends of the struts 70 is a generally square support frame 72 which is substantially the same size as cooling plate 54. Vertical struts 70 secure the support frame 72 above the cooling plate 54. The frame 72 is fabricated from a material having a generally L-shaped cross-sectional configuration such that it defines a peripheral inner flange portion.

Figure 2:
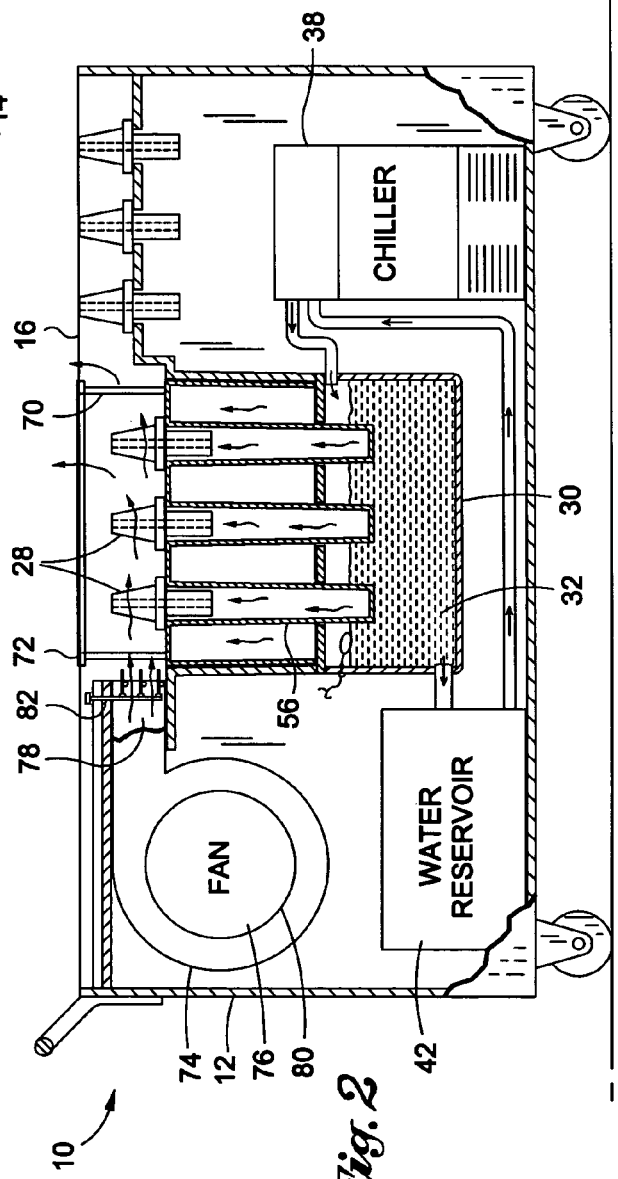
FIG. 2 is another partial cross-sectional view of the heat shrink tool holder cooler.

As previously described, cooling plate 54 may be inserted into and removed from the cart 12 through cooling chamber opening 50. As seen in FIG. 2, support frame 72 is supported in cooling chamber opening 50 by the top wall 16 of cart 12 such that cooling plate 54 hangs from the support frame 72 by the vertical support struts 70. Additionally, the length of vertical support struts 70 may vary depending upon the size of heat shrink tool holder 28 and sleeve 56. For example, if a lengthier tool holder sleeve 56 is used, then the length of vertical support struts 70 may require shortening in order for a portion of the tool holder sleeves 56 to be disposed within the water tank 30. Alternatively, if the length of the plurality of heat shrink tool holder sleeves 56 are shorter, then vertical support struts 70 may be lengthened so that tool holder 28 is fully enclosed in cooling chamber 24 when cooling plate 52 is inserted therein and the distal end 58 of the plurality of tool holder sleeves 56 are disposed within the water tank 30. The struts 70 may be constructed such that their lengths are adjustable via a set screw in order to configure an appropriate height for struts 70 according to the size of tool holders 28 to be inserted in the cooling plate 54. The struts 70 or the tool holder sleeves 56 are configured such that the plurality of tool holder sleeves 56 with heated tool holders 28 are disposed within the water tank 30 to be cooled by water 32 at a desired depth.

In order to cool the heated tool holders 28, cooling plate 54 includes a plurality of heated tool holders 28 retained thereon, disposed within the cooling chamber 24 of the cart 12. As seen in FIG. 2, the cart 12 supports the chiller 38. The chiller 38 is used to cool water received from water reservoir 42. The water received by the chiller 38 from water reservoir 42 is cooled and circulated into the water tank 30. The cooling plate 54 is configured to receive the tool holder sleeves 56 that hold the tool holder 28 and extend from the cooling plate 54 into the water tank 30 to facilitate the cooling of the heated tool holders 28. In another embodiment, the struts 70 may also be adjusted such that a portion of the plurality of tool holder sleeves 56 extend more or less into the water tank 30. Alternatively, the plurality of tool holder sleeves 56 may be adjusted or sized to extend more or less into the water tank 30 having cooled water 32 circulated from the chiller 38. When a portion of the tool holder sleeve 56 extends into the cooled water 32 of the water tank 30, the heated tool holders 28 are cooled by convection. An aspect of the present invention contemplates the cooling of the tool holder sleeve 56 as a result of a portion of the sleeve 56 being disposed within the water tank 30. Furthermore, it is contemplated that the tool holder sleeve 56 may be tapered, resulting in a surface to surface or metal to metal contact between the tool holder sleeves 56 and the heated tool holders 28. The process of cooling sleeves 56 using cooled water 32 from the water tank 30 is known as thermal conduction. The cooling process allows heated tool holders 28 to reach ambient temperature in an efficient and timely manner. Additionally, the tool holder sleeve 56 increases in temperature when the heated tool holders 28 are received. The increased temperature of the sleeves 56 from receiving the heated tool holders 28 causes the water temperature of water 32 within the water tank 30 to increase. The increase in water temperature may be dependent upon the depth at which the tool holder sleeves 56 are disposed within the water tank 30 and a multitude of other variables. To offset the increase in temperature of the water 32, the chiller 38 selectively regulates the circulating of cooled water to the water tank 30. Furthermore, it is contemplated that water flows from water tank 30 to water reservoir 42 in order to circulate the heated water back into the chiller 38 for cooling. This results in a constant cycling of cooled water 32 into the water tank 30. The ability to maintain water 32 at a particular temperature through the cycling of heated water through the water reservoir 42 and the chiller 38 within the water tank 30 despite added heat emanating from the heated tool holders 28, allows for faster cooling of the heated tool holders 28.

In order to further cool the heated tool holders 28 as seen in FIGS. 1 and 2, the cart 12 supports a blower 74 disposed adjacent the cooling plate 54 for propelling ambient temperature air over the cooling plate 54 and therefore the heated tool holders 28. In another embodiment of the present invention, the blower 74 is an electric axial fan with an axial inlet 76 and a radial outlet 78. The axial inlet 76 of the blower 74 is in communication with a fresh air inlet port 80 disposed within a sidewall 14 of the cart 12. Therefore, the blower 74 can draw ambient temperature air through the inlet port 80 and into the blower axial inlet 76. Then blower 74 propels the air through radial outlet 78 in a radial stream that can be easily directed.

In yet another embodiment of the present invention, a damper 82 is positioned at the radial outlet 78 in order to regulate the flow of air exiting the blower 74. The damper 82 has a plurality of movable louvers 84 hinged to a movable controller 86. The controller 86 is positionable in a vertical direction, such that the louvers 84 are moved in a corresponding direction to divert flow of air exiting the blower 74. Therefore, it is possible to divert the flow of air with the plurality of louvers 84 such that the air can be directed to flow over the cooling plate 54 and therefore over the heated tool holders 28 retained thereon. Therefore with damper 82, it is possible to adjust the flow of air to an optimum direction as shown by the arrows in FIGS. 1 and 2, such that the airflow can be diverted entirely over the heated tool holders 28. Additionally, it will be recognized that the damper 82 can also be moved to a position whereby the louvers 84 can block or restrict the flow of air over the cooling plate 54 as may be necessary when inserting or removing the tool holder sleeve 56 or a tool holder 28 without turning off the blower 74.

Therefore, in accordance with the present invention the heat shrink tool holder cooler 10 cools the heat shrink tool holders 28 by cooling the plurality of sleeves 56 with tool holders 28 retained thereon. The sleeves 56 remain cool as a result of a portion of the sleeves 56 being disposed within the water tank 30 containing water 32 that may be constantly cycled through chiller 38 for maintaining cooled water within the water tank 30. Additionally or alternatively, the heated tool holders 28 are cooled by propelling a flow of ambient temperature air over them with the blower 74. The cooler 10 is mobile such that it is possible to heat and mount the cutting tools 64 into the tool holder 28 in one location and then transport and cool the tool holders 28 in another location. An advantage of using accessibly removable tool holder sleeves 56 to cool the tool holder 28 to an ambient temperature is the ability to prevent rusting of the cutting tool 64 or the tool holder 28. Because the tool holder sleeves 56 are disposed in the cooled water tank 30 of the unit 10, the tool holder 28 during the cooling process is not exposed to the water 32 and thus avoids rusting.

Figure 3:
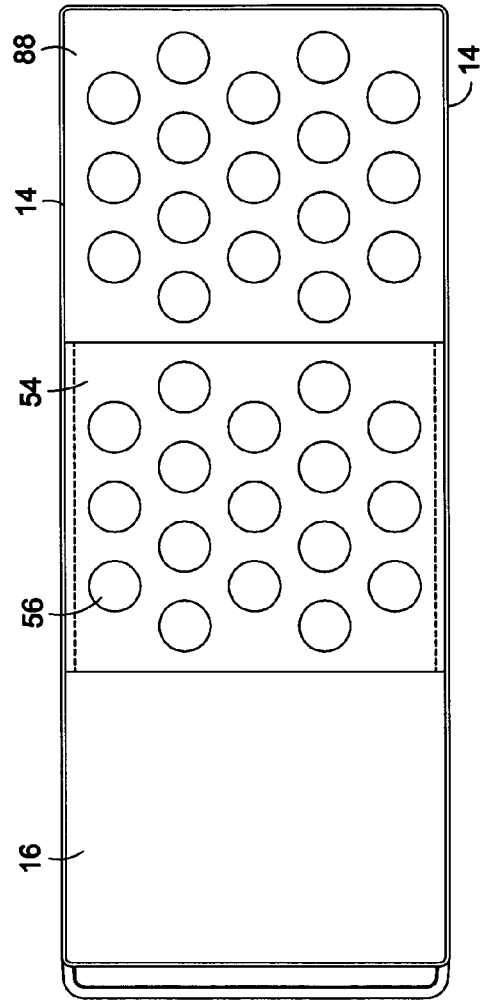
FIG. 3 is a top view illustrating a plurality of sleeves of the heat shrink tool holder cooler.

Referring to FIGS. 2 and 3, approximate the cooling chamber 24 is a storage area 88 for storing additional machine tool holders 28, parts, and accessories. The storage area 88 is accessible through the top wall 16 of the cart 12. It is also contemplated that the top wall 16 be made of a metal material or a heat resistant substance to accommodate warm to hot tool holders 28. A heat resistant top wall 16 improves the cooling ability of the heat shrink tool holder cooling unit 10. Additionally, the cooling plate 54 of the cooler 10 can be used for the storage of cutting tools 64 joined with tool holders 28 that have already been cooled to ambient temperature.

Additionally, other kinds of heat shrink fittings may be used with the cooler 10. As will be recognized, it is possible to configure the cooling plate 54 to retain heat shrink fittings such as machine tool extensions. Therefore machine tool extensions may also be cooled in the cooler 10 as well. Additionally, it is possible to configure the cooling plate 54 to retain both heat shrink machine tool holders 28 and heat shrink machine tool extensions simultaneously such that both types of heat shrink fittings are cooled at the same time.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A cooling unit for reducing a temperature of a heat shrink tool holder, the tool holder having a central aperture extending axially therein, an outer portion of the tool holder having a support member for supporting the tool holder on a cooling plate while enabling a reduced diameter portion of the tool holder to project into a tool holder sleeve, the cooling unit comprising:
    a housing having a cooling chamber;
    a water tank disposed within the cooling chamber for receiving a plurality of the tool holder sleeves;
    a cooling plate disposed within the cooling chamber, the cooling plate having a plurality of apertures, each one of the apertures being configured to receive the tool holder sleeve, the tool holder sleeve being configured to receive the tool holder, the tool holder sleeve having an inner diameter less than a diameter of the tool holder support member, the tool holder sleeve having an inner diameter greater than a diameter of the reduced portion of the tool holder; and
    a chiller disposed within the housing adjacent the water tank, the chiller being in fluid communication with the water tank.

2. The cooling unit of claim 1, wherein the tool holder sleeve is variable in size and shape to accommodate a variety of tool holders.

3. The cooling unit of claim 1, wherein the tool holder sleeve is accessibly removably mountable to the cooling plate such that a portion of the tool holder sleeve formed therein is disposed within the water tank.

4. The cooling unit of claim 1, wherein the tool holder sleeve has an adjustable length.

5. The cooling unit of claim 1, wherein the tool holder sleeve is tapered for receiving the reduced diameter portion of the heat shrink tool holder.

6. The cooling unit of claim 5, wherein the reduced diameter portion of the heat shrink tool holder is in contact with an inner surface of the tool holder sleeve.

7. The cooling unit of claim 1, wherein the tool holder sleeve is fabricated from a metallic material that functions as a heat sink.

8. The cooling unit of claim 7, wherein the metallic material is aluminum.

9. The cooling unit of claim 1, wherein the tool holder sleeve is configured to accommodate a heat shrink machine tool extension.

10. The cooling unit of claim 1, wherein the cooling plate is accessibly removably mountable within the cooling chamber.

11. The cooling unit of claim 1 wherein the cooling plate comprises:
    at least one strut attached to the cooling plate for supporting the cooling plate in the cooling chamber.

12. The cooling unit of claim 1, further comprising a pump disposed within the housing, the pump being configured for circulating water from the chiller to the water tank.

13. The cooling unit of claim 1, further comprising a blower disposed within the housing proximate the cooling plate for propelling a flow of ambient temperature air over the cooling plate.

14. A method of cooling a heat shrink tool holder comprising the steps of:
    a) receiving a tool holder sleeve on a cooling plate, the cooling plate having a plurality of apertures for receiving a plurality of tool holder sleeves;
    b) placing the heated tool holder in the tool holder sleeve, the tool holder having a support member for supporting the tool holder on the cooling plate, the tool holder having a reduced diameter portion for projecting into the tool holder sleeve;
    c) maintaining cooled water within a water tank, a portion of the tool holder sleeve being disposed within the water tank; and
    d) cooling the tool holder sleeve to thereby cool the tool holder to ambient temperature.

15. The method of claim 14, wherein step c includes pumping cooled water from a chiller to the water tank.

16. The method of claim 14, wherein step c includes measuring the water level within the water tank for regulating the water level.

17. A cooling unit for reducing a temperature of at least one heat shrink tool holder, the cooling unit comprising:
    a housing defining a cooling chamber;
    a water tank disposed within the cooling chamber;
    a cooling plate having a plurality of apertures formed therein which are each configured to accommodate a tool holder sleeve, the tool holder sleeve being configured to receive the tool holder; and
    a chiller disposed within the housing approximate the water tank for selectively regulating the flow of chilled water into the water tank.

18. The cooling unit of claim 17, wherein the housing further comprises:
    a water reservoir in fluid communication with the chiller, the water tank in fluid communication with the water reservoir for releasing heat gained water, the water reservoir providing the chiller with water for chilling.

* * * * *